United States Patent [19]
Balass

[11] 3,814,213
[45] June 4, 1974

[54] ENERGY STORAGE DEVICE
[75] Inventor: Valentin Balass, Zurich, Switzerland
[73] Assignee: Ferag AG, Hinwil, Switzerland
[22] Filed: May 22, 1972
[21] Appl. No.: 255,384

[30] Foreign Application Priority Data
June 4, 1971   Switzerland.................... 8220/71

[52] U.S. Cl..................... 185/39, 16/198, 49/386, 242/107 R
[51] Int. Cl.............................. F03g 1/00
[58] Field of Search.......... 185/37, 39; 16/197, 198; 49/379, 386; 242/84.3, 107 R

[56] References Cited
UNITED STATES PATENTS
| | | | |
|---|---|---|---|
| 687,229 | 11/1901 | Hadley | 16/198 |
| 1,322,407 | 11/1919 | Chegwidden et al. | 242/107.1 |
| 1,918,657 | 7/1933 | Millar | 242/107 R |
| 2,605,977 | 8/1952 | Gleason | 242/107.1 X |
| 2,855,162 | 10/1958 | Schacht, Jr. | 16/198 X |
| 3,308,907 | 3/1967 | Bodkin | 185/19 |

Primary Examiner—Allan D. Herrmann
Attorney, Agent, or Firm—Werner W. Kleeman

[57] ABSTRACT

An energy storage device incorporating an energy storage element acting upon a power take-off element. The energy storage element is spanned between two movable supports which form the terminal elements of a transmission wherein the transmission ratio differs from 1:1 in at least one power transmission path section thereof.

13 Claims, 4 Drawing Figures

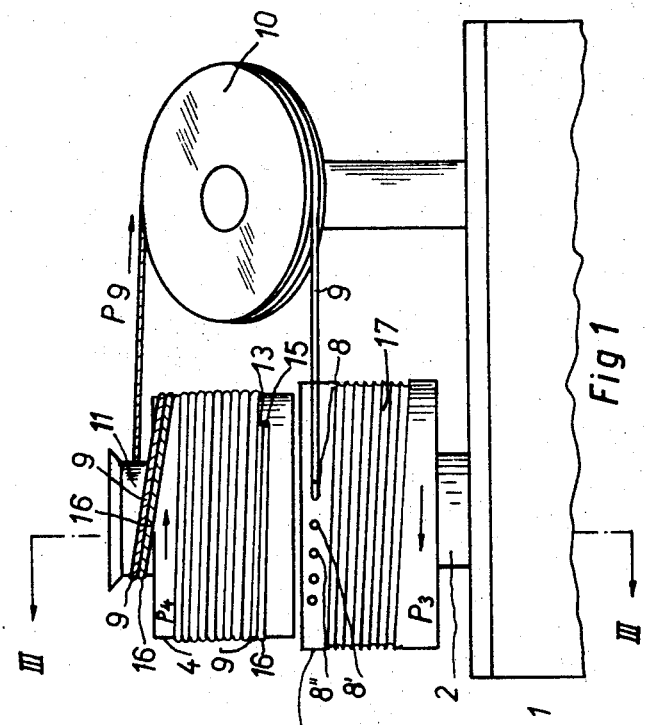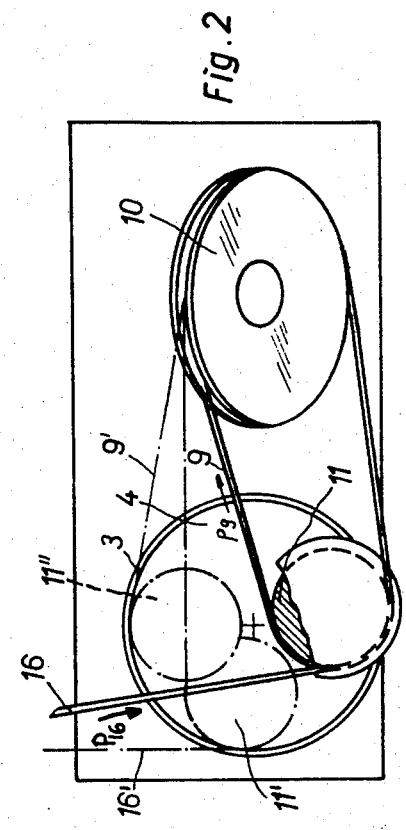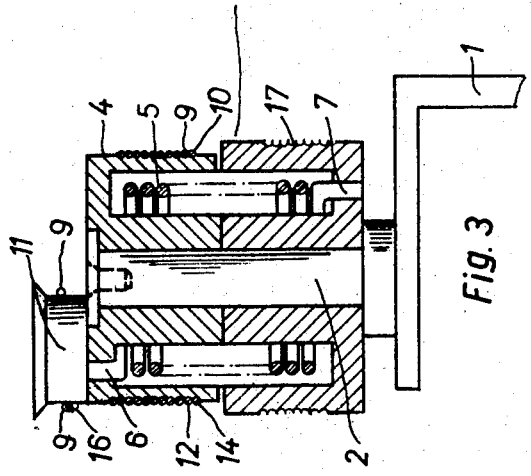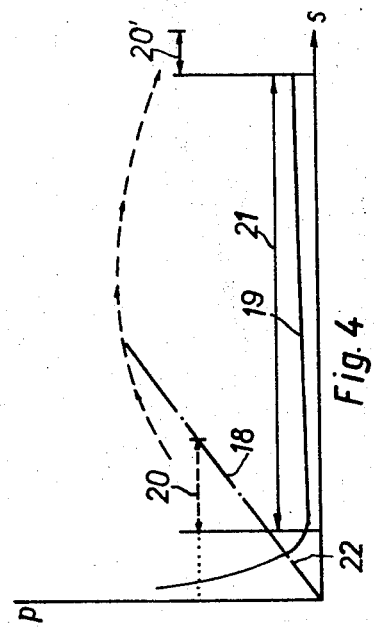

ENERGY STORAGE DEVICE

BACKGROUND AND OBJECTS OF THE INVENTION

The present invention relates to a new and improved energy storage device embodying an energy storage element acting upon a power take-off element. Moreover, the present invention is also concerned with the use of such energy storage device as a door keeper.

With a known construction of energy storage device of this general type the energy storage element is spanned between a fixed support and a support coupled with the power take-off element.

It is a primary object of the present invention to provide an improved construction of energy storage device which is relatively simple in design, extremely reliable in operation, and not readily subject to breakdown.

Another object of the present invention relates to the use of the inventive energy storage device as a door keeper.

In contrast to the above-discussed prior art construction of energy storage device the energy storage device of this development has the energy storage element spanned between two movable supports which form the terminal elements of a power transmission device or drive, wherein the transmission ratio differs from 1:1 in at least one path section.

BRIEF DESCRIPTION OF THE DRAWING

The invention will be better understood and objects other than those set forth above, will become apparent when consideration is given to the following detailed description thereof. Such description makes reference to the annexed drawing wherein:

FIG. 1 is a schematic front view of the inventive energy storage device;

FIG. 2 is a top plan view of the energy storage device depicted in FIG. 1;

FIG. 3 is a cross-sectional view of the energy storage device depicted in FIG. 1, taken substantially along the line III—III thereof; and FIG. 4 is a graph portraying the force-displacement characteristics of the energy storage device depicted in FIGS. 1 to 3.

DETAILED DESCRIPTION OF THE PREFERRED EMBODIMENTS

Describing now the drawings, the energy storage device depicted by way of example therein will be seen to comprise a shaft 2 secured to a support 1. Upon the shaft 2 there are rotatably mounted in axial direction adjacent one another and non-displaceably a pair of movable supports, here shown for instance as the cable drums 3 and 4. These cable drums 3 and 4 enclose by means of their outer surfaces a helically wound torsion spring 5 defining an energy storage element, the ends of which are anchored at locations 6 and 7 in the end walls of the cable drums 4 and 3 respectively. At the winding or wrap surface of the cable drum 3 there is anchored at location 8 a cable 9 or equivalent structure which travels over a deflecting roll 10 back to the other cable drum 4. This cable drum 4 carries at its end face a crankpin 11 which forms an extension or projection of the winding surface of the cable drum 4. As best seen by referring to FIG. 2, in the illustrated rotational position of the cable drum 4 the cable 9 travels via the crankpin 11 over the winding surface of the cable drum 4 and at that location bears with a number of wraps or coils at a helically-shaped cable groove 12, which, as should be readily apparent from the described arrangement, merges at its upper end, as best viewed in FIG. 1, with the crankpin 11. The end of the cable 9 is anchored at location 13 with the winding or wrap surface of the drum 4.

A second cable groove 14 is located at the winding surface of the cable drum 4, cable groove 14 extending along the first groove 12 and accordingly merging with its upper end, again as best seen by referring to FIG. 1, likewise with the crankpin 11. In this cable groove 14 there are located the coils or windings of a cable 16 defining a power take-off element and anchored at location 15 to the cable drum 4 and at which the stored energy or power is tapped-off.

The arrangement is designed such that the spring 5 owing to its pre-bias strives to rotate the cable drum 4 in the direction of the arrow $P_4$, that is in accordance with FIG. 2 in counterclockwise direction, and strives to rotate the cable drum 3 in the direction of the arrow $P_3$, that is according to the showing of FIG. 2, in the clockwise direction. The cable 9 interconnecting both cable drums 3 and 4, and extending from the deflecting roll 10 to the aforementioned cable drums in opposed winding sense, is retained in any case in a biased or tensioned condition with this arrangement by means of the spring 5 and throughout each rotational position of the cable drums 3 and 4. The pre-bias of the spring 5 is dependent upon in which anchoring location distributed about the periphery of the cable drum 3 the end of the cable 9 is suspended. For increasing the spring tension the end of this cable 9 must be suspended for instance in the anchoring 8' or in a further anchoring 8'' and so forth.

The cable drum 3 likewise possesses a helically-configured cable groove 17 into which is deposited the cable 9 during rotation of this drum in the direction of the arrow $P_3$. As should be readily apparent from the constructional arrangement itself a corresponding length of cable is thus paid-off of the drum 4 which rotates in the same sense as the drum 3, however with a somewhat increased rotational speed in accordance with the fact that the diameter of the drum 3 and therefore its winding radius is greater than the diameter and winding radius of the drum 4.

It is assumed that the cable 16 for the illustrated rotational position of the drum 4 cannot be pulled further in the direction of the arrow $P_{16}$. Hence nothing opposes retraction of the cable 16 opposite to the direction of the arrow $P_{16}$. If the cable is, in fact, pulled back, then, there is imparted to the drum 4 a rotation opposite to the direction of the arrow $P_4$, that is, in the clockwise direction of FIG. 2, and accordingly opposite to the rotational moment exerted upon such drum by the spring 5. Hence the crankpin 11 soon arrives at the position designated by reference character 11' in FIG. 2 and starting from this position the cable 16 winds-off directly from the winding or wrap surface of the cable drum 4, as indicated in phantom lines by reference character 16'. With such rotation of the cable drum 4 the run of the cable 9 which extends over to the cable deflecting roller 10 is also entrained by the crankpin 11. After the crankpin 11 reaches the position 11'', and with rotation of the cable drum 4 in the clockwise direction of FIG. 2, the cable 9 also directly winds-off from the periphery of the cable drum 4, as indicated by reference character 9'. The released length of cable is taken-up by the cable drum 3 since the spring 5 exerts a rotational moment upon cable drum 3 in the sense of winding-up cable, that is in the direction of the arrow $P_3$. During retraction or pulling back of the cable 16 the rotational speed of the cable drum 3 is accordingly smaller than that of the cable drum 4 since the winding radius of the cable drum 3, as previously mentioned, is greater than that of the cable drum 4. If the cable 16 is pulled back and therefore the cable drum 4 is placed into rotation, then, the cable drum 3 is also rotated in the same rotational sense through the action of the spring 5, however, as a function of the length of cable wound-off the drum 4, with a somewhat smaller rotational speed. Accordingly there appears a relative rotation between the supports of the spring 5 so that the spring tension or bias is increased. An opposite relative rotation between the spring supports occurs during rotation of the cable drums 3 and 4 in the opposite direction, that is the counterclockwise direction of FIG. 2, so that during such rotation of the cable drums the spring 5 can relax. As a result, owing to the spring bias, and to the extent that such allows a force to act upon the cable 16, there occurs a rotation of both cable drums 3 and 4 in the counter-clockwise direction of FIG. 2. With the course of the cables 16 and 9 as depicted in phantom lines in FIG. 2, that is for that rotational position of the cable drum 4 in which these cables directly travel off the winding surface of such drum, the spring supports are connected with one another by a power transmission or drive wherein the transmission ratio differs from 1:1, namely also is only slightly different as a function of the slight difference in diameter between both cable drums 3 and 4. The one end of the spring strives to rotate the cable drum 4 in the direction of the arrow $P_4$. However, the other end of the spring is also coupled with the cable drum 4, specifically via the cable drum 3 which strives to wind-up the cable 9 in the direction of the arrow $P_3$ in accordance with the rotational moment imparted thereto. This results in the presence of a cable force in the direction of the arrow $P_9$ which exerts a rotational moment upon the cable drum 4 opposing the rotational moment exerted directly upon this drum by the spring, however in accordance with the larger diameter of the cable drum 3 is somewhat smaller. Rotation of the cable drum 4 in the winding-up sense is only brought about by a differential rotational moment which is decisive for the cable force at the cable 16.

The foregoing explanation can be summarized as follows: during retraction of the cable 16 both cable drums rotate in the clockwise direction of FIG. 2 and therefore also the supports of the spring 5, yet the drum 4 rotates with one end of the spring quicker than the drum 3 with the other spring end so that the spring bias or tension increases. Since, however, in accordance with the selected transmission ratio the relative rotation between the drums 3 and 4 is small even during a number of revolutions thereof the spring tension only increases slightly, so that the cable force related to quite a considerable withdrawal length exhibits a very flat course or characteristic. Thus, in the converse manner it follows that during winding-up of the cable 16 by the spring force the cable force only decreases slightly. Hence, at this point is should be mentioned that in this way it is possible to tap-off a hardly changed spring force from a relatively small-volume spring over a relatively large path. The course of the force is not only a function of the spring characteristic, rather also a function of the transmission ratio of the power transmission or drive, at the end or terminal elements of which, defined by the drums 3 and 4, there are supported the spring ends. It should be apparent that a change in the transmission ratio along the path appropriately influences the force curve or course. For instance, it would be possible to profile at least one of both drums 3 and 4 such that the winding ratio during winding-up or winding-off of the relevant cable changes, for instance in such a manner that by virtue of the difference in radius the respectively increasing and decreasing spring tension is compensated. In this way the stored energy which can be tapped-off remains constant throughout the entire path in accordance with the phantom-line course of the cables 9 and 16.

It is now assumed that the extensively drawn-off cable 16 is retracted by the spring force in order, for instance, to move an object suspended at this cable in the direction of the arrow $P_{16}$. The cable 16 thus initially travels in accordance with the phantom depicted line 16' whereas the cable 9 travels in accordance with the phantom depicted line 9'. Hence, both cables will be wound onto the cable drum 4 during rotation of this drum 4 in the counter-clockwise direction of FIG. 2. As already mentioned, the differential rotational moment is decisive for the cable force which can be tapped-off or removed from the cable 16. Accordingly, this is the case only when the cable 9 is deposited in the last winding of the associated cable groove and the crankpin 11 has reached the position 11'. During further rotation of the drum 4 out of this position the cable 9 will be only still wound-up upon the crankpin 11 and pulled further by such, so that the lever arm of this cable force and related to the center point of the drum 4 continuously diminishes, finally attaining the value zero for that rotational position of the crankpin 11 where the cable 9 extends through the center point of the drum 4. With the reduction of the lever arm there of course also occurs a reduction in the rotational moment produced by the cable force and acting upon the drum 4 and to the same degree the differential rotational moment or torque increases and the cable force in the cable 16 increases. In this path region of power transmission the force which can be removed from the energy storage device is opposite to the spring force, whereas when the spring force continuously reduces in accordance with the increasing relaxation of the spring 5 the force which can be tapped-off increases. In the position of the crankpin 11 where the cable 9 extends through the center point of the drum 4 there is only still decisive for the cable force the rotational moment exerted by the spring, that is exerted by its upper end upon this drum. Now, if the drum 4 rotates further under the action of this rotational moment, then, the cable 9 departs from the center point so that now the cable force at such cable once again exerts a rotational moment upon the drum 4 through the agency of the increasing size lever arm, which is opposite to the previous lever arm. This rotational moment or torque is in the same direction as the rotational moment exerted by the upper end of the spring upon such drum and brings about a further increase of the force in the cable 16. The course of the force thus increases quite considerably as before although in this region the spring tends to relax relatively more quickly. In the full-line position of the crankpin 11 of FIG. 2 further retraction of the cable 16 as mentioned, is prevented for instance by a stop. The drum 4 thus has reached its terminal rotational position and the cable force at the cable 16 has reached its maximum value. If it is desired for the impact position of the cable 16 to have the cable force remain beneath such maximum value, then, this can be realized in two different ways: either the stop bearing against the cable 16 is displaced in the direction of the arrow $P_{16}$ so that the crankpin does not reach the full-line illustrated rotational position of FIG. 3 for the impact position of the cable, or else the crankpin 11 is pre-displaced along the periphery of the cable drum 4 in the clockwise direction.

Hence, briefly summarizing the above it should be recognized that the previously described mode of operation of such energy storage device illustrates that the upper end of the spring 5 always exerts a driving rotational moment or torque which is initially opposed by the lower end of the spring with a counter rotational moment. Decisive for this counter-rotational moment during a number of revolutions of the cable drum 4 is the difference in diameter between the cable drum 4 and the drum 3. The force characteristic curve is thus extremely flat. During the last partial revolution the lever arm of the counter-rotational moment decreases to zero and again increases with the opposite sign, so that now the lower end of the spring also generates a driving rotational moment or torque which adds to the previously already effective driving rotational moment or torque. The differential rotational moment in this phase is replaced by an increasing additive rotational moment and the force characteristic curve steeply increases.

A more pronounced increase in the course of the force or force characteristic curve during the last rotational phase causes the condition that also the cable 16 is no longer woundup upon the cable drum 4, rather only is pulled further by the crankpin 11 as soon as this crank pin 11 has moved through the rotational position depicted in FIG. 2 by reference character 11'. Starting from this position the cable 16 approaches the center point of the drum 4, with the consequence that the upper end of the spring 5 transmits the spring force to a continuously decreasing lever arm of the cable 16 and produces in such a cable force which increases by a corresponding amount. The described energy storage device possesses under these circumstances a force characteristic curve corresponding to the graph of FIG. 4. Line 18 illustrates the characteristic curve of the employed spring, whereas line 19 depicts the actual force characteristic curve of the energy storage device. The actual spring path during winding-up of the cable, starting from its full extended position until the crankpin in the position 11'' becomes effective corresponds to the difference of the paths 20 and 20'. The path 21 of the line 19 depicts the corresponding cable path. It will be observed that in this case the cable force is below the actual spring force in accordance with the differential rotational moment. The cable path which is considerably longer in contrast to the spring path results from the fact that the spring 5 is so to speak floatingly clamped, that is, clampingly entrained from position 20 to position 20', between both of the drums which in this phase rotate in the same sense but with relative rotational speeds. At the region of effectiveness of the crankpin 11, that is following the path 21, the force characteristic line increases quite steeply and intersects the spring characteristic line at location 22, in other words in accordance with that position of the crankpin 11 where the cable 9 travels through the center point of the drum 4. The summation or additive rotational moment present from this position on brings about a further increase in the force characteristic line so that in this phase the drums 4 and 3 rotate in opposite sense and the spring tends to relax quicker than previously.

The illustrated and described force characteristic curve renders the described embodiment of energy storage device particularly suitable for use as a door keeper. With a door keeper exactly such type of force characteristic curve is desired, —although with the prior art constructions same is realized with other means,— in order to initially move the open door with a smaller force, i.e., according to the path 21 of FIG. 4, and therefore slowly towards its closing position, and only then to allow the force to increase when the door is at the region of its closing position in order to ensure for snapping-in or shutting of the door handle. With the known door keepers the spring force which assumes a maximum value when the door has reached its open position will cause the door to accelerate much too quickly. In order to prevent this from happening these door keepers are equipped with a hydraulic dampening device or dashpot by means of which oil is pumped through a narrow throughpassage and the door can thus slowly approach its closed position as a function of the throughflow of such oil. When the door reaches the closed position there is then opened a larger size throughpassage, so that the dampening action is reduced or even eliminated and the spring sufficiently accelerates the door to cause such to move past the door threshold. This requirement is decisive for the dimensioning of the spring so that the spring force throughout the entire remaining phase of movement considerably exceeds the required amount. The conditions present with the described energy storage device are quite different, particularly since its "natural" force characteristic curve right from the start provides the type of curve desired for a door keeper.

When used as a door keeper the support 1 of the described energy storage device could be secured to the door wing and the end of the cable 16 could be anchored to the fixed door frame. Of course, the reverse arrangement would be possible without any difficulty. In the illustrated rotational position of the drum 4 the door would be closed. During opening of the door the resistance exerted by the energy storage device would decrease quite rapidly to a small value as a function of the force characteristic curve so that in this case, and in comparison to the known door keepers, less force need be exerted during the opening movement of the door. If the open door is then released it will approach the closed position with practically constant lower force. At the region of the closed position of the door the crankpin 11 assumes the rotational position 11'; at this point the closing force begins to increase rapidly and the door is sufficiently accelerated in order to move over the door threshold. A dampening action as contemplated with the prior art door keepers is basically unnecessary for the inventive energy storage device. Apart from dispensing with the expenditure associated with the provision of a hydraulic dampening device or dashpot, there is also dispensed with, among other things, the problems of hydraulic dampening devices associated with the temperature-dependent viscosity of the oil. It is also possible to manually close the door more quickly than would be possible if the door keeper itself were used without, as would be the case for the known door keepers, having to overcome any dampening action. Of course, in certain cases it could happen that because of the absence of any dampening action the door will be accelerated much too quickly owing to the action of additional forces, for instance a draft. In such case it would be possible to provide quite simple dampening, for instance air dampening. To this end it would be possible, for instance, to accommodate beneath the drum 3 a hose wound in a spiral-configuration about the shaft 2, the inner end of which would be anchored to the shaft and its outer end to the drum. During opening of the door the windings or coils of the hose would widen and the hose for instance formed of rubber could, owing to its inherent elastic structural stability, fill with air through the agency of a flap valve. During closing of the door the rotation of the drum 3 would bring about a more tight winding of the hose so that the windings would tend to bear against one another accompanied by escape of air from the interior of the hose through a throttle opening. During the last phase of the closing movement, and as previously mentioned, the rotational sense of the drum 3 changes so that here the dampening action would be automatically eliminated. When using dampening the tension cable 16 could be advantageously replaced by a toggle lever mechanism conventional for door keepers.

Energy storage devices corresponding in principle to the described embodiment can be realized in manifold constructional forms. For instance, it would be possible to use a single cable drum with a cable anchored and wound thereon. In such case the ends of for instance a hairpin-shaped spring would be anchored to the free end of the cable and to pivot bearing arranged at the drum, the pivot bearing being arranged within the winding diameter. The free end of the cable must be guided within a guide extending approximately in the direction of the cable. With this arrangement and in accordance with the dissimilar lever arms of both spring ends there would be produced a differential rotational moment or an additive rotational moment. The change-over from one region to the other occurs when the spring end anchored to the cable drum moves through the connection line of the drum center point and the other spring end. The force could be tapped-off for instance from the cable drum by means of a further cable, a toggle lever or in any other suitable manner. The force characteristic curve of such energy storage device would essentially differ from the curve depicted in FIG. 4 in that within the path 21 it would possess a downwardly domed configuration.

The force characteristic curve depicted in FIG. 4 can be realized if there is used a cable drum which corresponds in construction to that of the cable drum 4 and with such cable drum being rigidly connected with a cable drum of larger diameter. Onto the first cable drum there would be wound a cable corresponding to the cable 9 and there would be anchored thereat the one of, for instance, a hairpin-shaped spring, whereas a further cable would be wound in the opposite direction onto the other cable drum and the other end of the spring would be anchored thereto. Now as a function of the difference in the winding diameter there is also present for such construction of energy storage device a differential rotational moment which initially corresponds to the course of the line within the path 21 of FIG. 4. The increase in the force characteristic curve occurs in accordance with the described embodiment owing to the effectiveness of the crank pin applied to the smaller cable drum. Also this embodiment would be suitable as a door keeper.

It should be clear that with an energy storage device where the energy storage element is spanned between the terminal or end elements of a transmission or drive in the manner previously described it is possible to obtain any optional course of the force characteristic curve. What is decisive therefore is namely only the change in the transmission ratio and/or the change in the sense or direction of movement of the terminal elements of the transmission with regard to one another, and wherein with movement of the terminal elements in the same sense the spring ends work in opposed relationship and with movement of the terminal elements in opposite sense the spring ends work so as to assist one another. The change in the direction of the tapped-off force is not necessarily associated with the change in the movement sense or direction (reverse drive). Such directional change occurs then when with change in the transmission ratio there is exceeded the ratio 1:1. With such behavior there cannot be tapped-off any force. With a suitable form of the drums 3 and 4 it is possible, for instance, to achieve the result that a door remains in its completely open position.

While there is shown and described present preferred embodiments of the invention, it is to be distinctly understood that the invention is not limited thereto but may be otherwise variously embodied and practiced within the scope of the following claims. Accordingly,

What is claimed is:

1. An energy storage device comprising a power take-off element, an energy storage element acting upon said power take-off element, a pair of movable supports for spanning said energy storage element therebetween, said pair of movable supports forming terminal elements of a power transmission in which the transmission ratio at least at one transmission path section thereof differs from 1:1, means mounting said pair of movable supports to revolve about a common axis of rotation, means for connecting said pair of movable supports with one another for rotational movement, said energy storage element comprising a torsion spring having respective ends coaxially arranged with respect to said axis of rotation and supported at said pair of movable supports, each of said movable supports comprising a rotatable cable drum, said connecting means comprising a cable which can be wound-up and wound-off said cable drums for interconnecting said cable drums with one another, at least one roller for deflecting the cable from one cable drum to the other cable drum, and wherein one cable drum possesses at the marginal region of its winding surface a clearly smaller winding radius than the other cable drum and that its winding surface at its end face possesses a crankpin-like projection past which extends the cable.

2. The energy storage device as defined in claim 1, wherein same constitutes a closing mechanism for an object.

3. The energy storage device as defined in claim 2, wherein the closing mechanism is used in conjunction with an object defining a door.

4. The energy storage device as defined in claim 1, including means for varying the sense of movement of the terminal elements relative to one another.

5. The energy storage device as defined in claim 1, including means for changing the sense of movement of the terminal elements relative to one another.

6. The energy storage device as defined in claim 1, wherein said power transmission possesses a constant transmission ratio.

7. The energy storage device as defined in claim 1, wherein the transmission possesses a variable transmission ratio at least at one transmission path section thereof.

8. The energy storage device as defined in claim 7, wherein the transmission ratio is variable in the opposite sense starting from a ratio of 1:1.

9. The energy storage device as defined in claim 1, wherein the transmission possesses means providing a changeable transmission ratio at least at one transmission path section thereof.

10. The energy storage device as defined in claim 9, wherein the transmission ratio is changeable in the opposite sense starting from a ratio of 1:1.

11. The energy storage device as defined in claim 1, wherein the projection can be displaced in peripheral direction.

12. An energy storage device comprising an energy storage element, a power take-off element, said energy storage element acting upon said power take-off element, a pair of movable supports, said energy storage element being spanned between said pair of movable supports, said pair of movable supports forming terminal elements of a power transmission at which the transmission ratio at least at one transmission path section thereof differs from 1:1, means for connecting said pair of movable supports for movement with one another, said energy storage element cooperating with said pair of movable supports to produce an effective torque acting upon the power take-off element, which effective torque in dependency upon the position of said pair of movable supports either decreases or increases.

13. The energy storage device as defined in claim 1, wherein the projection can be displaced in peripheral direction.

* * * * *